INVENTOR.
Tohchung Wei
BY Polachek & Saulsbury
ATTORNEYS.

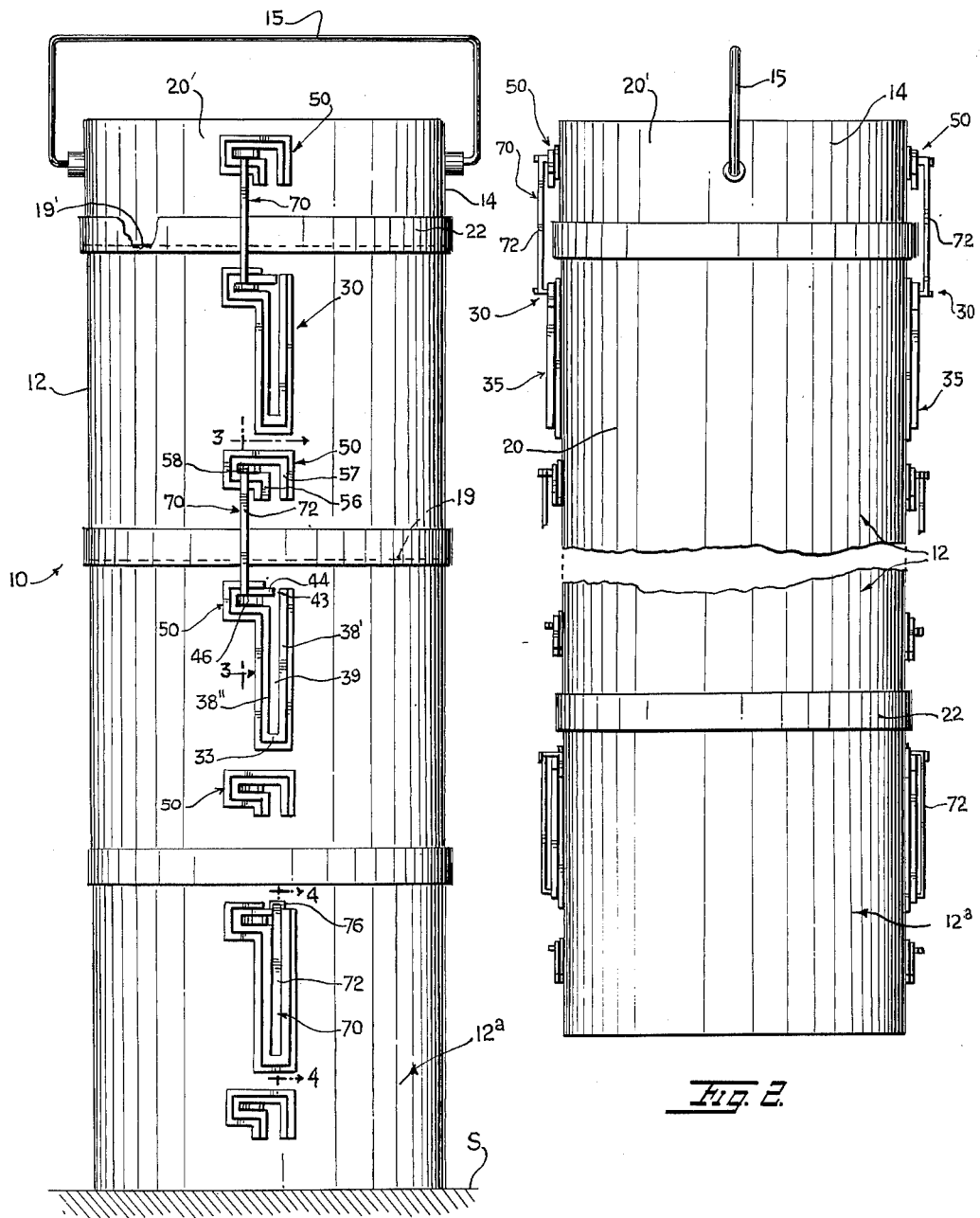

United States Patent Office 3,259,263
Patented July 5, 1966

3,259,263
TWIN LOCK FOR MULTI-FOOD CONTAINERS
Tohchung Wei, 169 E. Broadway, New York, N.Y.
Filed Feb. 10, 1964, Ser. No. 343,686
10 Claims. (Cl. 220—4)

This invention concerns means for quickly attaching and detaching stacked cylindrical metal vessels used for containing and cooking foods. This invention is an improvement over my prior Patent 2,838,044.

It has been proposed heretofore to attach cylindrical vessels together to form a cylinder stack by means of bayonet joints, screw couplings and other devices which require relative rotation of the vessels to attach the vessels together and to separate them.

The prior attachment means are disadvantageous and difficult to use when the cylindrical vessels have large diameters of the order of six inches or more, since the vessels are then difficult to grasp manually for turning one vessel with respect to the other. When the vessels are in a heated condition, the vessels cannot be grasped manually for turning one with respect to the other. Often the couplings jam or stick due to expansion of the metal walls of the vessels and the food in the vessels is spilled while the vessels are forced apart. In my prior patent I disclose a coupling device including two C-shaped keepers with a link engageable on the keepers. The link is removably engaged on the keepers and only a single link joins one keeper on each of two vessels.

The present invention is an improvement over my prior patent and is directed at overcoming the above-mentioned and other difficulties and disadvantages of prior vessel coupling means. In the present invention, a pair of coupling devices or assemblies are provided for each pair of coupled vessels instead of just one coupling assembly as in my prior patent. Each of the coupling devices of the present invention has a link held for joining two keepers, one on each of the coupled vessels. The link is held captive in one keeper on one vessel. The link is slidably mounted on the one keeper between coupled and decoupled positions. In the coupled position, the link engages both keepers and is locked by spring means in coupled position. In the uncoupled position, the link is held stationary on the one keeper in which it is held captive. In order to disengage the coupled vessels, it is not necessary to touch or turn the coupled vessels.

It is therefore a principal object of the invention to provide improved detachable coupling devices for cylindrical vessels.

Another object is to provide a pair of cooperating coupling devices for coupling two cylindrical vessels in axial alignment, each coupling device including two keepers and a slidable link held captive on one of the keepers.

A further object is to provide coupling devices as described, wherein each keeper has disengageable locking means for holding a link in a position coupling two keepers.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a stack of cylindrical vessels with coupling devices embodying the invention.

FIG. 2 is a side elevational view of the stack of vessels of FIG. 1, taken in a position rotated 90° from the position of FIG. 1, with parts broken away.

Figure 3:
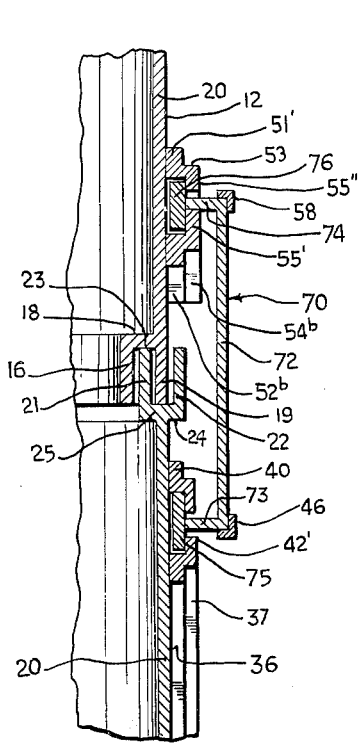
FIG. 3 and FIG. 4 are enlarged fragmentary sectional views taken on lines 3—3 and 4—4, respectively, of FIG. 1.

Referring first to FIGS. 1–4, there is shown a stack 10 of axially aligned and superimposed cylindrical vessels, cans or containers 12, with a cylindrical cover 14 on top of the stack. Each of the vessels and the cover has an internal cylindrical flange 16 spaced inwardly of the vessel or cover by a radial flange 18; see FIG. 3. The flange 16 is spaced from the lower cylindrical end 19 of the outer walls 20 of the vessels or lower end 19' of cylindrical wall 20' of the cover. The cylindrical flange 16 and wall end 19 or 19' interfit with concentric cylindrical flanges 21, 22 at the upper end of each vessel. This arrangement defines annular sealing areas 23, 24 between adjacent vessels. Sealing area 23 is defined between the upper end flange 21 and the bottom of radial flange 18. Sealing area 24 is defined between the bottom end 19 or 19' of wall 20 or 20' and the upper end 25 of wall 20. A tortuous path interrupted twice by sealing areas 23, 24 is thus provided between the interior and exterior of each vessel and serves to retain food flavors, aromas and vapors within the vessels which may be in a heated condition. Cover 14 is provided with a handle 15 for carrying the stack of vessels which are coupled together with coupling devices or assemblies 30 embodying the invention. These coupling devices or assemblies are arranged for quick attachment and detachment of the vessels from each other and from the cover.

The structure of the coupling devices or assemblies 30 is shown clearly in FIGS. 1–5. Each of the devices includes a lowerkeeper 35 which is a generally L-shaped member normally disposed in an inverted position. It has an axially vertical U-shaped outer flange 36 which is welded, riveted or otherwise secured in face abutment to the outer side of wall 20 of a vessel. Integral with this flange is a U-shaped spacer flange 37 which extends perpendicularly outward of flange 36. Integral with the outer edge of flange 37 is a U-shaped flange 38 extending in a plane parallel to flange 36. A long slot 39 is defined between inner opposing edges of the arms of flange 38. One arm 38' of flange 38 is longer than the other arm 38". Slot 39 is closed at bight 33 at the bottom of flange 38.

Integral with flange 36 and coplanar therewith is another U-shaped flange 40 which is also welded or otherwise secured in face abutment to wall 20. A U-shaped spacer flange 41 extends outwardly of flange 40. Flanges 40 and 41 are normally disposed in axially horizontal position. An outer U-shaped flange 42 is integral with flange 41 and extends parallel to flange 40 and coplanar with flange 38. Flange 42 is also axially horizontal and has a lower shorter arm 42' connected to the upper end of flange arm 38". The upper longer arm 42" extends up to but terminates just short of the upper end of flange arm 38' to define a narrow slot 43. Flange 41 terminates short of the free end of flange arm 42" to define a horizontal finger 44 which serves to close the upper end of slot 39 while the flat bight 45 closes the lower end of slot 39.

A spring finger 46 is struck out of the inner edge of the bight 48 of flange 42 and overlays part of the narrow horizontal slot 49 defined between inner opposing edges of flange arms 42' and 42". Slots 39 and 49 together define an inverted L-shaped slot between bight 48 and bight 33.

The coupling device includes an upper keeper 50. This keeper is shaped like the upper part of keeper 35. Keeper 50 has a generally L-shaped structure and is normally disposed in a position rotated 90° from upright position. The keeper 50 includes a U-shaped flange 51 which is secured to a vessel 20 near the bottom end 19 or to cover 14 near bottom end 19'. Flange 51 has a longer horizontal upper arm 51' and a shorter lower horizontal arm 51". Depending from arms 51' and 51" at their free ends are vertical longer flange 52a and shorter flange 52b. These flanges are parallel and spaced apart.

Integral with flange 51 is an outwardly extending U-shaped spacer flange 53. Flange 53 is integral with outwardly extending vertical spacer flanges 54a, 54b extending outwardly of flanges 52a, 52b, respectively. A U-shaped outer flange 55 is secured to the outer edges of flange 53. Flange 55 has a short flange 56 extending downwardly from the end of shorter flange arm 55'. A longer outer flange 57 extends downwardly from the end of longer flange arm 55". A spring finger 58 is struck out of the inner edge of bight 59 of flange 55 and overlays narrow horizontal slot 60 defined between opposing edges of flange arms 55', 55". Slot 60 together with vertical slot 61 defined between adjacent edges of flanges 56 and 57 define an inverted L-shaped slot opening at the lower ends of flanges 56 and 57 and closed at the bight 59 of flange 55.

A coupling link 70 is movably carried by the keeper 35. This link is generally U-shaped with a long flat bight or handle 72 which serves as a handle and two short arms 73, 74 extending perpendicularly to handle 72. Two flat, rectangular plates 75, 76 are secured by welding or otherwise to the outer ends of arms 73, 74 in a coplanar disposition. The arms 73, 74 are centered to define free annular flanges all around the arms 73, 74.

Figure 5:
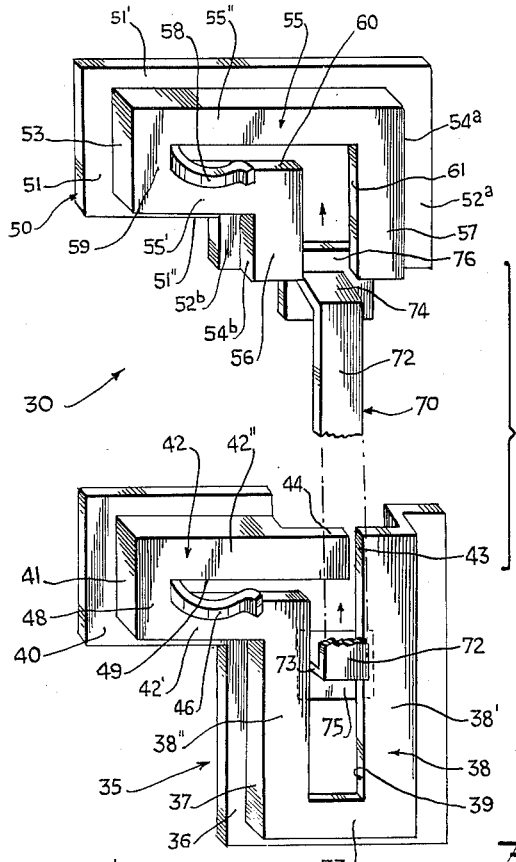
FIG. 5 is an enlarged, exploded perspective view of a coupling device according to the invention.

Plate 75, as clearly shown in FIG. 5, is carried by arm 73 which moves freely vertically in slot 39 while opposite vertical edges of plate 73 move under or behind edges of flange arms 38', 38". Arm 74 moves freely vertically in slot 61 while plate 76 moves freely behind or under edges of flanges 56, 57.

Link 70 can be moved horizontally to a coupling position when it is moved upwardly to a maximum extent in slots 39 and 61. By moving the link laterally to the left as viewed in FIG. 5, arm 73 moves horizontally in slot 49 while arm 74 moves in slot 60. Plate 75 moves inside of the flange arms 42', 42" while plate 76 moves inside of the flange arms 55', 55". At the extreme right or locking position of the link, the lower end of link handle 72 is engaged by spring finger 46 while the upper end of handle 72 is engaged by spring finger 58.

When the link 70 is moved upwardly, arm 73 is stopped by finger 44 of flange arm 42" so that the link 70 remains captive in the keeper 35. The slot 43 is provided to facilitate engagement of link 70 on keeper 35 prior to the mounting of the keeper on the wall of a vessel. Handle 72 is inserted laterally through slot 43 and then the link is turned to dispose plate 75 behind flange arms 38', 38" while the handle 72 with plate 76 extends upwardly clear of the keeper 35 for engagement in keeper 50.

Figure 4:
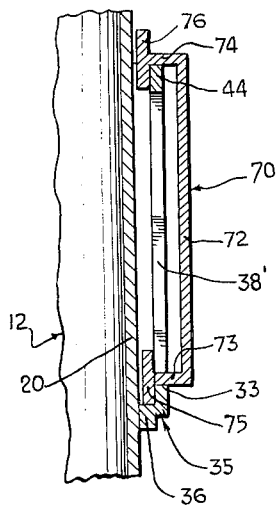

The link can be lowered to a keeping position in which keepers 35 and 50 are uncoupled, as shown particularly in FIG. 4. Arm 73 then rests on the bight 33 of flange 38 at the bottom of slot 39 while the arm 74 rests on the finger 44, with plate 75 engaged behind bight 33 and with plate 76 engaged behind the upper end of flange arm 38' and the bight end of flange arm 42". The slot 39 should be almost as long as handle 72 so that arm 74 rests on finger 44.

To be properly operative two or more keepers 35 and two or more keeper 50 should be provided on each vessel 20. Two such sets of keepers 35, 50 are shown located in diametrically opposed positions on the vessels in FIG. 2. If more than two sets are provided they should be located in equiangularly spaced positions. Two keepers 50 are provided on the axially short cover 14 which has a closed top and does not require keepers 35. However, keepers 50 could be provided on cover 14 if it should be desired to attach other vessels to the top of the cover, such as might occur if the cover 14 is to be used as a mounting base for another stack of vessels.

Figures 6, 7:
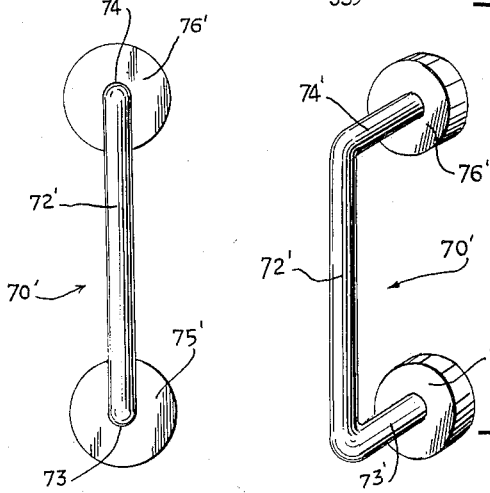
FIG. 6 is a front elevational view of a coupling link.
FIG. 7 is a perspective view of the coupling link of FIG. 6.

FIGS. 6 and 7 show an alternative link construction in which link 70' has a cylindrical bight or handle 72' in place of the flat bight 72 of link 70. Arms 73' and 74' are also cylindrical and attach to the centers of plates 75' and 76' which are circular. The link 70' can be used with keepers 35 and 50 in the same manner as link 70. The link can be moved between a lowered keeping position and an upper coupling position where the link is detachably locked by springs 46. The link 70' will also be held captive in keeper 35 by the finger 44 extending across slot 39".

The two or more coupling devices or assemblies 30 on each pair of coupled vessels cooperate in holding the vessels in closed sealing relationship. The use of a single coupling device with just one keeper 35 and one keeper 50 would not be satisfactory since the cylindrical vessels could not be coupled properly with less than two couplings.

It will be noted that the vessels and cover can be engaged and disengaged with each other without actually touching, moving or disturbing the vessels or cover. This is desirable if the vessels are in a heated condition or heavily loaded with food. In the stack 10 shown in FIGS. 1 and 2, the coupled cover and upper vessels 12 can be lifted off of the uncoupled lowermost vessel 12a which may be resting on a heating device or other surface S.

The vessels can be quickly engaged and disengaged. The coupling devices require no tools for operation. They are inexpensive to manufacture and assemble and very durable.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A coupling device for detachably engaging cylindrical vessels in alignment, comprising two generally L-shaped keepers, a first one of said keepers having a first base flange structure attachable to a wall of one of the vessels, a first spacer flange structure extending outwardly of the base flange structure, a first keeper flange structure integral with the spacer flange structure and disposed parallel to the base flange structure to define a first recess with the spacer flange structure, said keeper flange structure having a first L-shaped slot closed at opposite ends; a second one of said keepers having a second base flange structure attachable to a wall of another of the vessels, a second spacer flange structure extending outwardly of said second base flange structure, a second keeper flange structure integral with said second spacer flange structure to define a second recess with the second spacer flange structure, said second keeper flange structure having a second L-shaped slot closed at one end and open at the other end; and a link having a U-shaped structure with a straight, long bight handle, two short arms extending perpendicularly to opposite ends of the handle, and two plates secured to ends of said short arms and centered to define annular flanges all around the ends of the arms, said handle being disposed parallel to and spaced from the first keeper flange structure, one of said arms extending through the first slot with one of said plates slidably engaged behind edges of said first slot in the first recess, means retaining said link captive in said first slot, the other of said arms being insertable through the open end of the second slot and movable therealong to its closed end with the other of said plates slidably engaged behind edges of said second slot, whereby the two keepers are coupled together by said link when in a coupling position at one closed end of each slot in each keeper.

2. A coupling device for detachably engaging cylindrical vessels in alignment, comprising two generally L-shaped keepers, a first one of said keepers having a first base flange structure attachable to a wall of one of the vessels, a first spacer flange structure extending outwardly of the base flange structure, a first keeper flange structure integral with the spacer flange structure and disposed parallal to the base flange structure to define a first recess with the spacer flange structure, said keeper flange structure having a first L-shaped slot closed at opposite ends; a second one of said keepers having a second base flange structure attachable to a wall of another of the vessels, a second spacer flange structure extending outwardly of said second base flange structure, a second keeper flange structure integral with said second spacer flange structure to define a second recess with the second spacer flange structure, said second keeper flange structure having a second L-shaped slot closed at one end and open at the other end; and a link having a U-shaped structure with a straight, long bight handle, two short arms extending perpendicularly to opposite ends of the handle, and two plates secured to ends of said short arms and centered to define annular flanges all around the ends of the arms, said handle being disposed parallel to and spaced from the first keeper flange structure, one of said arms extending through the first slot with one of said plates slidably engaged behind edges of said first slot in the first recess, means retaining said link captive in said first slot, the other of said arms being insertable through the open end of the second slot and movable therealong to its closed end with the other of said plates slidably engaged behind edges of said second slot, whereby the two keepers are coupled together by said link when in a coupling position at one closed end of each slot in each keeper, and locking means on each keeper at said one closed end of the slot in each keeper for disengageably holding the link in said coupling position.

3. A coupling device for detachably engaging cylindrical vessels in alignment, comprising two generally L-shaped keepers, a first one of said keepers having a first base flange structure attachable to a wall of one of the vessels, a first spacer flange structure extending outwardly of the base flange structure, a first keeper flange structure integral with the spacer flange structure and disposed parallel to the base flange structure to define a first recess with the spacer flange structure, said keeper flange structure having a first L-shaped slot closed at opposite ends; a second one of said keepers having a second base flange structure attachable to a wall of another of the vessels, a second spacer flange structure extending outwardly of said second base flange structure, a second keeper flange structure integral with said second spacer flange structure to define a second recess with the second spacer flange structure, said second keeper flange structure having a second L-shaped slot closed at one end and open at the other end; and a link having a U-shaped structure with a straight, long bight handle, two short arms extending perpendicularly to opposite ends of the handle, and two plates secured to ends of said short arms and centered to define annular flanges all around the ends of the arms, said handle being disposed parallel to and spaced from the first keeper flange structure, one of said arms extending through the first slot with one of said plates slidably engaged behind edges of said first slot in the first recess, means retaining said link captive in said first slot, the other of said arms being insertable through the open end of the second slot and movable therealong to its closed end with the other of said plates slidably engaged behind edges of said second slot, whereby the two keepers are coupled together by said link when in a coupling position at one closed end of each slot in each keeper, and locking means on each keeper at said one closed end of the slot in each keeper for disengageably holding the link in said coupling position, the first slot in the first keeper having a straight portion substantially equal to the length of said bight handle so that the link is held in a stationary position with both ends engaged at opposite ends of said straight slot portion on the first keeper when the link is uncoupled from the second keeper.

4. A coupling device for detachably engaging cylindrical vessels in alignment, comprising two generally L-shaped keepers, a first one of said keepers having a first base flange structure attachable to a wall of one of the vessels, a first spacer flange structure extending outwardly of the base flange structure, a first keeper flange structure integral with the spacer flange structure and disposed parallel to the base flange structure to define a first recess with the spacer flange structure, said keeper flange structure having a first L-shaped slot closed at opposite ends; a second one of said keepers having a second base flange structure attachable to a wall of another of the vessels, a second spacer flange structure extending outwardly of said second base flange structure, a second keeper flange structure integral with said second spacer flange structure to define a second recess with the second spacer flange structure, said second keeper flange structure having a second L-shaped slot closed at one end and open at the other end; and a link having a U-shaped structure with a straight, long bight handle, two short arms extending perpendicularly to opposite ends of the handle, and two plates secured to ends of said short arms and centered to define annular flanges all around the ends of the arms, said handle being disposed parallel to and spaced from the first keeper flange structure, one of said arms extending through the first slot with one of said plates slidably engaged behind edges of said first slot in the first recess, means retaining said link captive in said first slot, the other of said arms being insertable through the open end of the second slot and movable therealong to its closed end with the other of said plates slidably engaged behind edges of said second slot, whereby the two keepers are coupled together by said link when in a coupling position at one closed end of each slot in each keeper, and a spring finger struck out of each keeper at the one closed end of the slot in each keeper for disengageably holding the link in said coupling position.

5. A coupling device for detachably engaging cylindrical vessels in alignment, comprising two generally L-shaped keepers, a first one of said keepers having a first base flange structure attachable to a wall of one of the vessels, a first spacer flange structure extending outwardly of the base flange structure, a first keeper flange structure integral with the spacer flange structure and disposed parallel to the base flange structure to define a first recess with the spacer flange structure, said keeper flange structure having a first L-shaped slot closed at opposite ends; a second one of said keepers having a second base flange structure attachable to a wall of another of the vessels, a second spacer flange structure extending outwardly of said second base flange structure, a second keeper flange structure integral with said second spacer flange structure to define a second recess with the second spacer flange structure, said second keeper flange structure having a second L-shaped slot closed at one end and open at the other end; and a link having a U-shaped structure with a straight, long bight handle, two short arms extending perpendicularly to opposite ends of the handle, and two plates secured to ends of said short arms and centered to define annular flanges all around the ends of the arms, said handle being disposed parallel to and spaced from the first keeper flange structure, one of said arms extending through the first slot with one of said plates slidably engaged behind edges of said first slot in the first recess, means retaining said link captive in said first slot, the other of said arms being insertable through the open end of the second slot and movable therealong to its closed end with the other of said plates slidably engaged behind edges of said second slot, whereby the two keepers are coupled together by said link when in a coupling position at one closed end of each slot in each keeper, and a spring finger struck out of each keeper at the one closed end of the slot in each keeper for disengageably holding the link in said coupling position, the first slot in the first keeper having a straight portion substantially equal to the length of said bight handle so that the link is held in a stationary position with both ends engaged at opposite ends of said straight slot portion on the first keeper when the link is uncoupled from the second keeper.

6. A coupling assembly for detachably engaging cylindrical vessels in alignment, comprising at least two generally L-shaped cooperating keepers located at equally and circumferentially spaced positions on one of said vessels, each of said keepers having a first base flange structure attachable to a wall of one of the vessels, a first spacer flange structure extending outwardly of the base flange structure, a first keeper flange structure integral with the spacer flange structure and disposed parallel to the base flange structure to define a first recess with the spacer flange structure, said keeper flange having a first L-shaped slot closed at opposite ends; at least two other generally L-shaped cooperating keepers located at equally and circumferentially spaced positions on another of said vessels corresponding in position to the keepers on the one vessel when the vessels are coupled together in axial alignment, each of said other two keepers having a second base flange structure attachable to a wall of the other vessel, a second spacer flange structure extending outwardly of the second base flange structure, a second keeper flange structure integral with the second spacer flange structure to define a second recess with the second spacer flange structure, said second keeper flange structure having a second L-shaped slot closed at one end and open at the other end; and at least two links for coupling respectively one of the first-named keepers with one of the other keepers, each of said links having a U-shaped structure with a straight, long bight handle, two short arms extending perpendicularly to opposite ends of the handle, and two plates secured to ends of said short arms and centered to define annular flanges all around the ends of the arms, said handle being disposed parallel to and spaced from the first keeper flange structure, one of said arms extending through the first slot with one of said plates slidably engaged behind edges of said first slot in the first recess, means retaining said link captive in said first slot, the other of said arms being insertable through the open end of the second slot and movable therealong to its closed end with the other of said plates slidably engaged behind edges of said second slot, whereby one of the first-named keepers and one of the other keepers are coupled together by one of the links when the link is in a coupling position at one closed end of each slot in each of the two coupled keepers.

7. A coupling assembly for detachably engaging cylindrical vessels in alignment, comprising at least two generally L-shaped cooperating keepers located at equally and circumferentially spaced positions on one of said vessels, each of said keepers having a first base flange structure attachable to a wall of one of the vessels, a first spacer flange structure extending outwardly of the base flange structure, a first keeper flange structure integral with the spacer flange structure and disposed parallel to the base flange structure to define a first recess with the spacer flange structure, said keeper flange having a first L-shaped slot closed at opposite ends; at least two other generally L-shaped cooperating keepers located at equally and circumferentially spaced positions on another of said vessels corresponding in position to the keepers on the one vessel when the vessels are coupled together in axial alignment, each of said other two keepers having a second base flange structure attachable to a wall of the other vessel, a second spacer flange structure extending outwardly of the second base flange structure, a second keeper flange structure integral with the second spacer flange structure to define a second recess with the second spacer flange structure, said second keeper flange structure having a second L-shaped slot closed at one end and open at the other end; and at least two links for coupling respectively one of the first-named keepers with one of the other keepers, each of said links having a U-shaped structure with a straight, long bight handle, two short arms extending perpendicularly to opposite ends of the handle, and two plates secured to ends of said short arms and centered to define annular flanges all around the ends of the arms, said handle being disposed parallel to and spaced from the first keeper flange structure, one of said arms extending through the first slot with one of said plates slidably engaged behind edges of said first slot in the first recess, means retaining said link captive in said first slot, the other of said arms being insertable through the open end of the second slot and movable therealong to its closed end with the other of said plates slidably engaged behind edges of said second slot, whereby one of the first-named keepers and one of the other keepers are coupled together by one of the links when the link is in a coupling position at one closed end of each slot in each of the two coupled keepers, and locking means on each keeper at said one closed end of the slot in each keeper for disengageably holding a link in coupling position.

8. A coupling assembly for detachably engaging cylindrical vessels in alignment, comprising at least two generally L-shaped cooperating keepers located at equally and circumferentially spaced positions on one of said vessels, each of said keepers having a first base flange structure attachable to a wall of one of the vessels, a first spacer flange structure extending outwardly of the base flange structure, a first keeper flange structure integral with the spacer flange structure and disposed parallel to the base flange structure to define a first recess with the spacer flange structure, said keeper flange having a first L-shaped slot closed at opposite ends; at least two other generally L-shaped cooperating keepers located at equally and circumferentially spaced positions on another of said vessels corresponding in position to the keepers on the one vessel when the vessels are coupled together in axial alignment, each of said other two keepers having a second base flange structure attachable to a wall of the other vessel, a second spacer flange structure extending outwardly of the second base flange structure, a second keeper flange structure integral with the second spacer flange structure to define a second recess with the second flange structure, said second keeper flange structure having a second L-shaped slot closed at one end and open at the other end; and at least two links for coupling respectively one of the first-named keepers with one of the other keepers, each of said links having a U-shaped structure with a straight, long bight handle, two short arms extending perpendicularly to opposite ends of the handle, and two plates secured to ends of said short arms and centered to define annular flanges all around the ends of the arms, said handle being disposed parallel to and spaced from the first keeper flange structure, one of said arms extending through the first slot with one of said plates slidably engaged behind edges of said first slot in the first recess, means retaining said link captive in said first slot, the other of said arms being insertable through the open end of the second slot and movable therealong to its closed end with the other of said plates slidably engaged behind edges of said second slot, whereby one of the first-named keepers and one of the other keepers are coupled together by one of the links when the link is in a coupling position at one closed end of each slot in each of the two coupled keepers, and a spring finger struck out of each keeper at the one closed end of the slot in each keeper for disengageably holding the link in said coupling position.

9. A coupling assembly for detachably engaging cylindrical vessels in alignment, comprising at least two generally L-shaped cooperating keepers located at equally and circumferentially spaced positions on one of said vessels, each of said keepers having a first base flange structure attachable to a wall of one of the vessels, a first spacer flange structure extending outwardly of the base flange structure, a first keeper flange structure integral with the spacer flange structure and disposed parallel to the base flange structure to define a first recess with the spacer flange structure, said keeper flange having a first L-shaped slot closed at opposite ends; at least two other generally L-shaped cooperating keepers located at equally and circumferentially spaced positions on another of said vessels corresponding in position to the keepers on the one vessel when the vessels are coupled together in axial alignment, each of said other two keepers having a second base flange structure attachable to a wall of the other vessel, a second spacer flange structure extending outwardly of the second base flange structure, a second keeper flange structure integral with the second spacer flange structure to define a second recess with the second spacer flange structure, said second keeper flange structure having a second L-shaped slot closed at one end and open at the other end; and at least two links for coupling respectively one of the first-named keepers with one of the other keepers, each of said links having a U-shaped structure with a straight, long bight handle, two short arms extending perpendicularly to opposite ends of the handle, and two plates secured to ends of said short arms and centered to define annular flanges all around the ends of the arms, said handle being disposed parallel to and spaced from the first keeper flange structure, one of said arms extending through the first slot with one of said plates slidably engaged behind edges of said first slot in the first recess, means retaining said link captive in said first slot, the other of said arms being insertable through the open end of the second slot and movable therealong to its closed end with the other of said plates slidably engaged behind edges of said second slot, whereby one of the first-namd keepers and one of the other keepers are coupled together by one of the links when the link is in a coupling position at one closed end of each slot in each of the two coupled keepers, the first slot in each of the first-named keepers having a straight portion substantially equal to the length of said bight handle so that each link is held in a stationary position with both ends engaged at opposite ends of said straight slot portion on each of the first-named keepers when the links are uncoupled from said other keepers.

10. A coupling assembly for detachably engaging cylindrical vessels in alignment, comprising at least two generally L-shaped cooperating keepers located at equally and circumferentially spaced positions on one of said vessels, each of said keepers having a first base flange structure attachable to a wall of one of the vessels, a first spacer flange structure extending outwardly of the base flange structure, a first keeper flange structure integral with the spacer flange structure and disposed parallel to the base flange structure to define a first recess with the spacer flange structure, said keeper flange having a first L-shaped slot closed at opposite ends; at least two other generally L-shaped cooperating keepers located at equally and circumferentially spaced positions on another of said vessels corresponding in position to the keepers on the one vessel when the vessels are coupled together in axial alignment, each of said other two keepers having a second base flange structure attachable to a wall of the other vessel, a second spacer flange structure extending outwardly of the second base flange structure, a second keeper flange structure integral with the second spacer flange structure to define a second recess with the second spacer flange structure, said second keeper flange structure having a second L-shaped slot closed at one end and open at the other end; and at least two links for coupling respectively one of the first-named keepers with one of the other keepers, each of said links having a U-shaped structure with a straight, long bight handle, two short arms extending perpendicularly to opposite ends of the handle, and two plates secured to ends of said short arms and centered to define annular flanges all around the ends of the arms, said handle being disposed parallel to and spaced from the first keeper flange structure, one of said arms extending through the first slot with one of said plates slidably engaged behind edges of said first slot in the first recess, means retaining said link captive in said first slot, the other of said arms being insertable through the open end of the second slot and movable therealong to its closed end with the other of said plates slidably engaged behind edges of said second slot, whereby one of the first named keepers and one of the other keepers are coupled together by one of the links when the link is in a coupling position at one closed end of each slot in each of the two coupled keepers, and locking means on each keeper at said one closed end of the slot in each keeper for disengageably holding a link in coupling position, the first slot in each of the first-named keepers having a straight portion substantially equal to the length of said bight handle so that each link is held in a stationary position with both ends engaged at opposite ends of said straight slot portion on each of the first-named keepers when the links are uncoupled from said other keepers.

References Cited by the Examiner

UNITED STATES PATENTS

| | | | |
|---|---|---|---|
| 1,065,633 | 6/1913 | Stone | 220—4 |
| 2,838,044 | 6/1958 | Wei | 126—369.3 |

LOUIS G. MANCENE, *Primary Examiner.*

G. E. LOWRANCE, *Assistant Examiner.*